United States Patent [19]

Weiss et al.

[11] Patent Number: 4,935,099
[45] Date of Patent: Jun. 19, 1990

[54] PROCESS FOR MAKING WOOD CHARCOAL

[75] Inventors: Hans-Jürgen Weiss, Oberursel; Jörg Schmalfeld, Friedrichsdorf; Ingo Dreher, Oberursel; Johannes Arnhold, Heusenstamm, all of Fed. Rep. of Germany

[73] Assignee: Metallgesellschaft Aktiengesellschaft, Frankfurt am Main, Fed. Rep. of Germany

[21] Appl. No.: 368,178

[22] Filed: Jun. 19, 1989

[30] Foreign Application Priority Data

Jun. 21, 1988 [DE] Fed. Rep. of Germany ....... 3820913

[51] Int. Cl.[5] .................... C10B 49/06; C10B 53/02
[52] U.S. Cl. ........................................ 201/27; 201/29; 201/34; 201/37; 201/39
[58] Field of Search ............ 201/27, 29, 34, 37, 201/39, 43; 202/99, 121

[56] References Cited

U.S. PATENT DOCUMENTS

| | | | |
|---|---|---|---|
| 1,510,730 | 10/1924 | Wilcox | 201/29 |
| 2,289,917 | 7/1942 | Lambiotte | 201/43 |
| 3,090,731 | 5/1963 | Keil | 201/27 |
| 3,140,987 | 7/1964 | Warner | 201/27 |
| 3,177,128 | 4/1965 | Vartanian | 201/29 |
| 3,977,947 | 8/1976 | Pyle | 201/27 |
| 4,329,202 | 5/1982 | White et al. | 201/27 |

FOREIGN PATENT DOCUMENTS

| | | | |
|---|---|---|---|
| 836515 | 6/1976 | Belgium. | |
| WO79/00610 | 8/1979 | PCT Int'l Appl. | 201/27 |

Primary Examiner—Joye L. Woodard
Attorney, Agent, or Firm—Herbert Dubno

[57] ABSTRACT

Lump wood is carbonized in a shaft retort, which is flown through by hot rinse gas. The wood is charged to the retort at its top. Wood charcoal is withdrawn from the lower portion of the retort. An exhaust gas which contains gases and vapors produced by carbonization is withdrawn from the top end of the shaft retort and is directly fed to a combustion chamber. In a first section of the combustion chamber, the exhaust gas is combusted with air at an understoichiometric to stoichiometric rate at temperatures from 800° to 1250° C. Part of the combustion gas is withdrawn from that first section of the combustion chamber and is cooled to temperatures from about 450° to 900° C. and is fed as a rinse gas to the shaft retort. In a second section of the combustion chamber, the exhaust gas is completely combusted with air supplied at an overstoichiometric rate.

13 Claims, 1 Drawing Sheet

PROCESS FOR MAKING WOOD CHARCOAL

FIELD OF THE INVENTION

Our present invention relates to a process for carbonizing wood in a moving bed shaft retort, which is traversed by a hot rinse or carbonization gas and serves to produce charcoal.

BACKGROUND OF THE INVENTION

The product of wood charcoal by the carbonization of wood is an age old process capable of producing a product having a wide range of utilities, e.g. for metallurgical reduction purposes, adsorbent preparation purposes and even household use, e.g. for picnicking and barbecuing.

The carbonization of the wood can be effected in a static mass or in a moving bed system.

By and large, however, conventional moving bed systems have been neither economical nor environmentally sound and tended to give rise to vapors and gases which were environmental pollutants and tended to require auxiliary energy sources or to consume uneconomical quantities of the wood as fuel.

OBJECTS OF THE INVENTION

It is an object of the invention to effect the carbonization in a manner which is economical and environmentally sound.

Another object of the invention is to provide a process for the transformation of wood to wood charcoal which avoids drawbacks of the prior art processes.

SUMMARY OF THE INVENTION

The invention provides a process for the production of wood charcoal from pieces of wood in a shaft-type or upright reactor hereinafter referred to as a shaft retort or, more generally, as a retort and in which the wood charcoal is produced by a carbonization process.

The process of the invention comprises the steps of:

(a) charging an upright moving-bed retort at an upper end with wood to be carbonized, passing the wood charged into the upper end downwardly through the retort, and removing wood charcoal at a lower end of the retort;

(b) introducing a hot carbonizing gas into the retort for carbonizing the wood moving downwardly therein and producing an exhaust gas containing carbonization vapors and gases;

(c) withdrawing the exhaust gas containing carbonization vapors and gases from the upper end of the retort and directly feeding the exhaust gas to a combustion chamber;

(d) combusting the exhaust gas containing carbonization vapors and gases withdrawn from the upper end of the retort and directly fed to the combustion chamber in a first section of the combustion chamber with air in a quantity at most stoichiometrically sufficient for combustion of the exhaust gas and at a temperature of substantially 800° to 1250° C. to produce a combustion gas;

(e) withdrawing part of the combustion gas from the combustion chamber, cooling the withdrawn part to a temperature of substantially 450° to 900° C. and feeding the cooled withdrawn part of the combustion gas as the hot carbonizing gas of step (b) to the retort; and (f) completely combusting a remainder of the combustion gas in a second section of the combustion chamber with air in a quantity in excess of a quantity stoichiometrically sufficient for complete combustion of the remainder of the combustion gas.

In accordance with the invention, therefore, the aforedescribed objects are accomplished in that the retort exhaust gas, which contains gases and vapors produced by the carbonization, is withdrawn from the top end of the shaft retort and is directly fed to a combustion chamber. The exhaust gas is combusted in a first section of the combustion chamber with air at an understoichiometric to stoichiometric rate at a temperature from 800 to 1250° C. Part of the combustion gas is withdrawn from the first section and is cooled to temperatures from about 450 to 900° C. and is fed as a rinse gas to the shaft retort, and the exhaust gas is completely combusted in a second section of the combustion chamber with air supplied at an overstoichiometric rate. The exhaust gas withdrawn from the top end of the shaft retort is fed to the combustion chamber without being cooled and so as to avoid a formation of condensate.

BRIEF DESCRIPTION OF THE DRAWING

The above objects, features and advantages will become more readily apparent hereinafter, reference being made to the accompanying drawing, the sole FIGURE of which is a flow diagram illustrating an apparatus for carrying out the process of the invention.

SPECIFICATION DESCRIPTION

Figure 1:
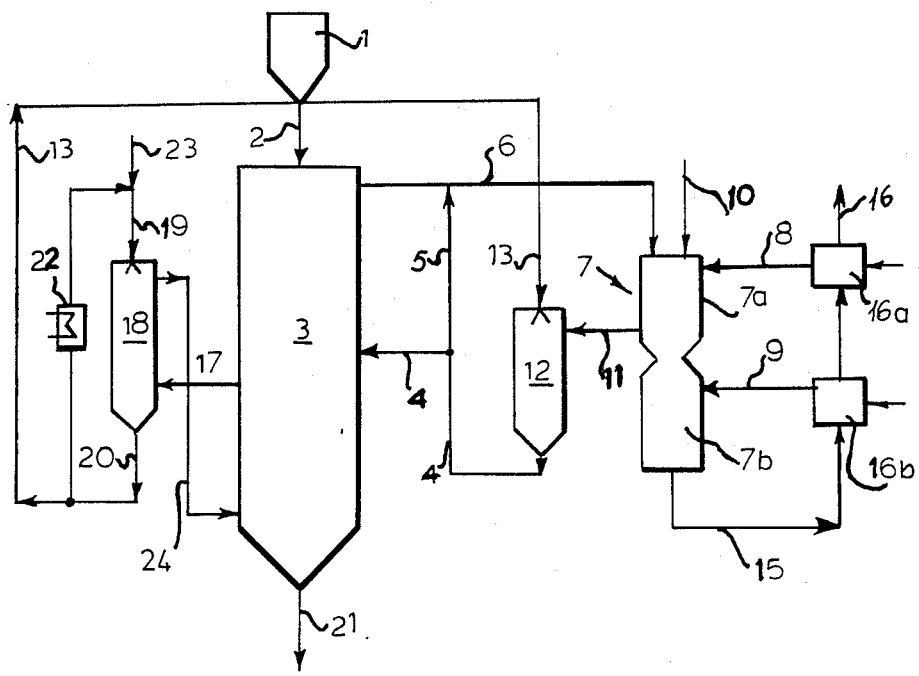

Lump wood to be carbonized usually contains 15 to 30% by weight or more moisture and is fed from the supply bin 1 via line 2 to the shaft retort 3, which will also be described hereinafter as a carbonization retort.

In the the wood constitutes a bed of bulk material or a moving bed which descends slowly. The carbonization is effected in direct contact with hot rinse or carbonization gases, which come from line 4 and are fed approximately to the middle portion of the retort at temperatures from 450 to 900° C.

As the rinse gases rise, the wood is carbonized and is dried in the uppermost portion of the retort. The exhaust gas thus formed consists of rinse gas and of gases and vapors produced by carbonization and is withdrawn from the top end of the retort 3 in line 6 and is fed to a combustion chamber 7.

In order to avoid condensation in line 6, it may be desirable to add a partial stream of the hot rinse gas through line 5.

The combustion chamber 7 comprises two sections, which are at different combustion conditions. Air is fed through line 8 at an understoichiometric to just the stoichiometric rate to the first section 7a so that the combustion constituents are not completely oxidized therein and the combustion gases contain, if possible, no free oxygen or hardly contain free oxygen. In case of need, e.g. for starting-up, additional fuel is supplied via line 10.

That part of the combustion gases which is required for the carbonization in the retort 3 and is at temperatures in the range from 800 to 1250° C. is withdrawn in line 11 from the first section 7a of the combustion chamber. Depending upon the desired temperature the combustion gases may be passed through an injection cooler 12, which is supplied with water through line 13. In addition to fresh water, waste water obtained in the process may be used for that purpose.

Depending upon the desired utilization of heat, the hot combustion gases from line 11 may alternatively be indirectly cooled to the temperature which is required for the carbonization by being used to preheat the combustion air from lines 8 and 9.

The cooled combustion gas contains 40 to 60% by volume water vapor and in dependence on individual conditions is at a temperature in the range from 450 to 900° C. and is fed in line 4 to the carbonization retort 3 as a rinse gas.

In the combustion chamber 7, the remaining gases enter the section 7b and are entirely combusted with air from line 9, i.e. with a surplus of oxygen. As a result, disturbing constituents will be substantially eliminated so that the combustion gases usually can be withdrawn in line 15 without a further treatment and may be discharged into the atmosphere. Preferably, the combustion air from lines 8 and 9 is preheated by an indirect heat exchange in heat exchangers 16a and 16b with the exhaust gases from line 15.

The wood charcoal produced in the carbonization retort 3 is cooled in the lower section of the retort. This is effected with cooling gas, which is supplied in line 24 at a temperature from about 30 to 60° C. and rises in the moving bed of the retort 3 and is withdrawn in line 17 and is recirculated through a wet-process gas cooler 18 into line 24 The cooling water comes from line 19 and leaves the cooler in line 20.

Part of the waste water from line 20 is brought to the required temperature of about 20 to 40° C. in a recooler 22 and is recycled to the wet-process gas cooler 18. Fresh water comes from line 23. A partial stream of the solids-containing waste water may be fed via line 13 to the injection cooler 12.

SPECIFIC EXAMPLES

Example 1

In a processing system in accordance with the drawing, eucalyptus lump wood containing 15% by weight moisture is carbonized to form wood charcoal containing 92% fixed carbon, on an average. The maximum temperature in the carbonization reactor is 650° C.

The following data are based on 1 kg of dry wood material in the wood feedstock. Hot rinse gas at 680° C. is fed at a rate of 0.75 scm (scm = cubic meter at standard temperature and pressure) are fed via line 4 to the retort 3. The exhaust gas has a temperature not in excess of 140° C. as it leaves the retort 3 by an admixing of 0.12 scm hot rinse gas from line 5 and is heated to 180° C. Temperatures of about 1120°C. prevail in the combustion chamber. A total of 3 scm combustion gases is produced in the combustion chamber. 0.15 kg of waste water are consumed in the injection cooler 12. The cooling gas in line 24 is at a temperature of 50° C. and the withdrawn gas in line 17 is at a temperature of 350° C. The wood charcoal which is produced is used in metallurgy as a reducing agent.

Example 2

In a processing system in accordance with the drawing, lump oakwood which contains 20 by weight moisture is carbonized at a temperature not in excess of 430° C. to produce a wood charcoal which has an average content of 82% fixed carbon. The wood charcoal may be used, e.g. for barbecuing.

Combustion temperatures of about 935° C. are obtained in the combustion chamber. The following data are again based on 1 kg of dry wood matter in the wood feedstock. Combustion gases at a total rate of 3.8 scm is fed to the retort 3 as a hot rinse gas at a temperature of 480° C. In the injection cooler 12, the rinse gas had previously been cooled with 0.23 kg waste water from the gas-cooling cycle. The exhaust gas is at a temperature of about 120° C. as it leaves the reactor 3 and by an admixing of 0.24 scm hot rinse gas from line 5 is heated to 180° C. The temperature in line 24 is 40° C. and in line 17 is 250° C.

We claim:

1. A process for carbonizing wood to produce wood charcoal, comprising the steps of:
   (a) charging an upright moving-bed retort at an upper end with wood to be carbonized, passing the wood charged into said upper end downwardly through said retort, and removing wood charcoal at a lower end of said retort;
   (b) introducing a hot carbonizing gas into said retort for carbonizing the wood moving downwardly therein and producing an exhaust gas containing carbonization vapors and gases;
   (c) withdrawing said exhaust gas containing carbonization vapors and gases from said upper end of said retort and directly feeding said exhaust gas to a combustion chamber;
   (d) combusting the exhaust gas containing carbonization vapors and gases withdrawn from said upper end of said retort and directly fed to said combustion chamber in a first section of said combustion chamber with air in a quantity at most stoichiometrically sufficient for combustion of said exhaust gas and at a temperature of substantially 800° to 1250° C. to produce a combustion gas capable of further combustion;
   (e) withdrawing part of said combustion gas from said combustion chamber, cooling the withdrawn part to a temperature of substantially 450° to 900° C. and feeding the cooled withdrawn part of the combustion gas as said hot carbonizing gas of step (b) to said retort; and
   (f) completely combusting a remainder of said combustion gas in a second section of said combustion chamber with air in a quantity in excess of a quantity stoichiometrically sufficient for complete combustion of said remainder of said combustion gas.

2. The process defined in claim 1 wherein said carbonizing gas is introduced into said upright retort at a location above a lower portion of said upright retort, said method further comprising the step of cooling said wood charcoal in said lower portion of said upright retort.

3. The process defined in claim 1 wherein said withdrawn part of the combustion gas is cooled in step (e) by injecting water into said withdrawn part of the combustion gas.

4. The process defined in claim 3 wherein said carbonizing gas is introduced into said upright retort at a location above a lower portion of said upright retort, said method further comprising the step of cooling said wood charcoal in said lower portion of said upright retort.

5. The process defined in claim 4 further comprising cooling said wood charcoal in said lower portion of said upright retort by recirculating a cooling gas through said lower portion, and cooling said cooling gas with water in a wet-process cooler.

6. The process defined in claim 5 wherein at least part of the water used to cool said cooling gas in said wet-process cooler is then used for injection into said withdrawn part of the combustion gas to cool said withdrawn part of the combustion gas in step (e).

7. The process defined in claim 1, further comprising admixing a partial stream of said carbonization gas of step (e) with the exhaust gas withdrawn in step (c).

8. The process defined in claim 7 further comprising cooling said wood charcoal in said lower portion of said upright retort by recirculating a cooling gas through said lower portion, and cooling said cooling gas with water in a wet-process cooler.

9. The process defined in claim 8 wherein at least part of the water used to cool said cooling gas in said wet-process cooler is then used for injection into said withdrawn part of the combustion gas to cool said withdrawn part of the combustion gas in step (e).

10. The process defined in claim 1, further comprising the step of heating the air admitted into said sections by indirect heat exchange with the completely combusted gas discharged from said second section of said combustion chamber.

11. The process defined in claim 10, further comprising admixing a partial stream of said carbonization gas of step (e) with the exhaust gas withdrawn in step (c).

12. The process defined in claim 11 wherein said carbonizing gas is introduced into said upright retort at a location above a lower portion of said upright retort, said method further comprising the step of cooling said wood charcoal in said lower portion of said upright retort.

13. The process defined in claim 12 wherein said withdrawn part of the combustion gas is cooled in step (e) by injecting water into said withdrawn part of the combustion gas.

* * * * *